F. H. RICHARDS.
ART OF MAKING TYPES AND TYPE BARS.
APPLICATION FILED DEC. 20, 1900.

919,217.

Patented Apr. 20, 1909.
4 SHEETS—SHEET 1.

Witnesses
C. A. Jarvis.

Inventor
F. H. Richards.

F. H. RICHARDS.
ART OF MAKING TYPES AND TYPE BARS.
APPLICATION FILED DEC. 20, 1900.

919,217.

Patented Apr. 20, 1909.
4 SHEETS—SHEET 2.

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

ART OF MAKING TYPES AND TYPE-BARS.

No. 919,217.            Specification of Letters Patent.            Patented April 20, 1909.

Application filed December 20, 1900. Serial No. 40,574.

*To all whom it may concern:*

Be it known that I, FRANCIS H. RICHARDS, a citizen of the United States, residing at Hartford, in the county of Hartford and State of Connecticut, have invented certain new and useful Improvements in the Art of Making Types and Type-Bars, of which the following is a specification.

This invention relates to the art of making types and type-bars, and especially to a method of making from a solid blank or bar of metal a type-bar adapted for use in the typographic art for printing a line of characters.

The present invention is in the nature of an improvement upon that shown, described and claimed in the application of Darien W. Dodson, Serial No. 600,152, filed July 22, 1896, to which I have permission to refer. In the Dodson process the separate types are formed on the edge of a type-bar blank by first removing excess material from the edge of a type-bar blank to set off a solid type-bar and then subjecting the face of this blank to the compressing action of a type-die to form a type. In this Dodson process the removal of the excess material is effected usually by slotting the edge of the type-bar blank at two separated points to set off between the slots a solid type-blank, and the die preferably operates upon the latter with a rolling movement in order to form the type. This rolling movement, however, in the Dodson process, is a simple one, it being a progressive cycloidal movement in a proper orbit.

My present invention is also in the nature of a companion process to the processes shown, described and claimed in my application Serial Nos. 740,512, filed December 16, 1899, and 740,673, filed December 18, 1899, in which applications there are disclosed two species of processes for forming a type upon a typebar-blank without previously setting off a type-blank; that is to say, in my said prior applications I have illustrated two specific methods of forming a type upon the edge of a typebar-blank without first reducing or removing material in advance of the metal from which such type is to be formed. Two of the principal features which distinguish my said companion processes from that of Dodson are these: I avoid the necessity of setting off a finished type-blank before the die is brought into action, and I subject each type-formative portion of the blank to repeated rolling operations, preferably of such a character that not only will the face of the type be perfectly finished but the base portion will also be finished and strengthened to such an extent as to enable it to resist greater crushing forces and last longer.

My present invention is a method of making types, and especially type-bars which differs generically from the Dodson process and from each of the processes shown in my said companion applications, in that in my said companion applications the process of forming a space in advance of each type is not independent of, but is dependent upon, the process of forming such type, whereas in the present case not only is the invention distinguishable from the Dodson process by reason of the fact that the space in advance of each type is not formed prior to such type, but it is also distinguishable from the processes described in my said companion applications by reason of the fact that the operation of forming the space is entirely independent of the operation of forming the type preceding such space. In my said companion applications the process of forming the space in advance of a type is dependent upon the process of forming such type for the reason that in such case the space is formed by a wall of the die which forms the type, whereas in the present case the process of forming a space in advance of the type is not dependent upon the process of forming such type for the reason that the space and the type are formed by separate and independent members, the type being formed in this case by rolling a die in contact with the edge of the blank, and the space being formed by rotating a milling-cutter in contact with the edge of such blank.

In forming a type on a typebar-blank in accordance with my present process I compress a portion of the blank in contact with a type-die while such portion is supported at its forward side, and in making a space in advance of such type I remove material from that portion of the typebar-blank which is in advance of such type, after the type has been completed, this being one species of the process of forming a type and a space in advance of such type independently without first forming the space, another species of such process being shown, described, and claimed in my companion application Serial No. 38,614, filed December 4, 1900, which covers the process of forming a type and a space in advance of such type independently but preferably synchronously, the formation of the space beginning and ending at the same time as the type-forming operation. The formation of a space in advance of each type is not only accomplished by an operation independent of that for making the type but by one which need not be at all analogous thereto. This is the case with the present invention in which each type is formed by rolling the edge of the typebar-blank, while the space in advance thereof is preferably made by milling away the stock, this latter operation, of course, serving merely to remove material from the blank and exerting no compression or condensing action thereon. In carrying out the present process the removal of material in advance of a type does not begin until such type has been completed; that is to say, in the process which constitutes the subject-matter of this invention the type-forming and space-forming operations are not only entirely independent of each other, but they are successive, and the material in advance of the forming type, and which serves as a means for resisting the type-forming action and supporting the type at its forward side, is not removed at all until the formation of the type is finished. When the operation of forming such a space is carried on in this manner it will be evident that the whole body of the resistant material or stock at the forward side of each type is preserved throughout the whole of the type-forming operation, and that the material in the type-field and the material in the space field are connected directly to each other throughout the whole period during which the blank is gradually rolled to form a type. That improvement in the art of forming type-bars in which a type and a succeeding space are formed by independent operations, but in which the making of the space is begun not earlier than the beginning of the type-forming operation and is preferably synchronous with the latter, is not set forth herein but constitutes the subject-matter of my companion application Serial No. 38,614, filed December 4, 1900.

In the drawings accompanying this specification and forming a part of the present application.

Similar characters designate like parts in the different figures of the drawings.

Figure 15:
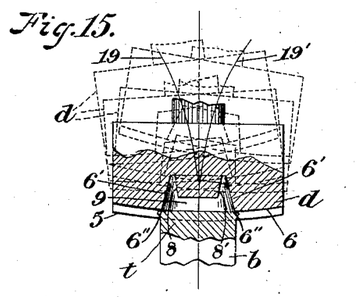
Figs. 15 to 20, inclusive, are sectional end elevations of a portion of a die and a typebar-blank enlarged to about ten times the natural size, and illustrate successive steps in the operation of forming a type by repeated rollings.
Figure 16:
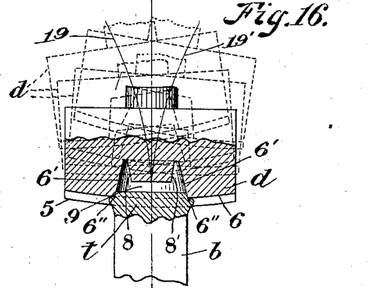
Figure 17:
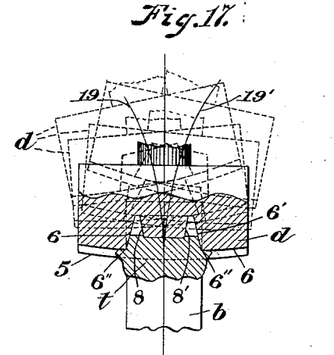
Figure 18:
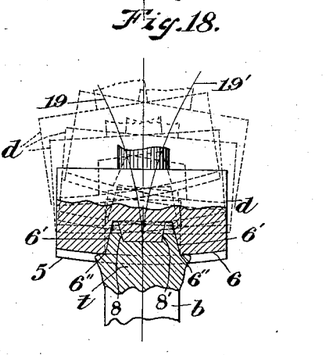
Figure 19:
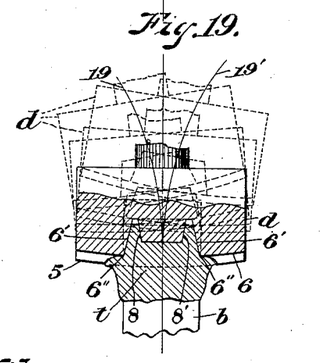
Figure 20:
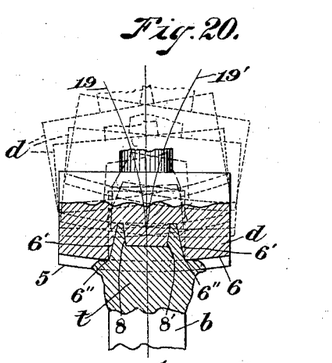

The blank may be subjected to the necessary repeated operations in any suitable manner, but while hand-operated tools may be employed for the purpose, suitable mechanism will ordinarily be used. Moreover, while different tools may be employed for operating upon each separate face of a type-block or type-blank I have deemed it preferable to make use of a single tool or die, as when one of these coöperating members is moved properly relatively to the other a single die is sufficient to subject the type-blank to all of the various operations which it undergoes before becoming a finished type. This type-die, however, is so constructed in the present case as to be capable of forming only a type, and each space in advance of a type is intended to be formed by a separate and independently operating member. Any proper type-die may be employed for the purpose of forming a type, and this may be mounted in any desired manner, though I prefer to support one or more type-dies, such as d, on a carrier, such as D, which carrier may be secured to a shaft, such as 2, having a movement of revolution about another axis and also a movement of rotation about its own axis, the resultant movement of each die when its carrier is rotating and revolving being, of course, a cycloidal one, as indicated in Figs. 15, 16, etc.

The blank, which may be of any material suitable for the purpose, but will usually be a type-metal of proper composition, is designated by b, and may be supported by and be movable with a carrier, such as B′, mounted on a fixed carrier, such as B, and movable thereon toward and from the type-forming die which coöperates therewith. In this case the movable carrier B′ has a bore therein, in which is seated a spring, such as 3, which at its upper end is in contact with a face of the fixed carrier B and tends to force the movable carrier B′ downward, while suitable operating means, such as an angle-lever 15, on a rock-shaft 15′, and carrying at its end an antifriction-roll 15″, may be employed for the purpose of raising the movable carrier B′ on the carrier B by which it is guided in its vertical movements.

The entire operation of forming a type is carried out in this case by operating a die in contact with the typebar-blank and feeding said blank toward the die, and the die employed is so constructed that it forms a type but does not form a space in advance of such type. A die of this construction while operating as a single mechanical part, and while it is actually constructed in one piece, has many functions that may be carried out by a large number of tools each having a single function; that is to say, it not only serves to shear out a type-block to fill the die-space, but it also rolls the face of the type-block, swages the face of the type to form, and forges the end walls of the type.

Figures 12, 13, 14:
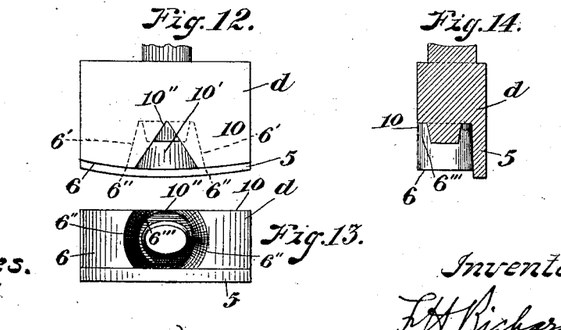
Figs. 12 and 13 are, respectively, a side elevation and an underside view of the die which I prefer to employ in carrying out my present process, the die being enlarged to about ten times the natural size.
Fig. 14 is a central transverse section of said die drawn to the same scale.

The type-dies shown herein have only one blade each, as distinguished from the dies shown in my companion applications Serial Nos. 740,512 and 740,673 hereinbefore referred to, this blade being at the rear side of the die and being preferably of the structure shown at 5. This blade is somewhat thin and is preferably considerably thinner than the tool which serves to form the space in advance of each type. Said blade forms a means for confining endwise of the bar flowage of the stock toward the rear side of the die, the solid body of metal in the blank in advance of the die that is being operated serving to confine endwise flowage at the forward side of the die, although, of course, during compression surplus stock will be free to flow out crosswise of the bar. The blade 5 will preferably project throughout its whole length beyond the outer or bottom wall 6 of the type-die, and hence throughout the whole period during which a type is being formed said blade serves to confine at that side of the die the mass of material that is being shaped. The bottom 6 of the die serves to roll out sidewise the major portion of the material not required for the making of a type. The end walls of the die-space, which are indicated herein by 6′, intersect the bottom 6 in the usual way, as at 6″, and the edges 6″ serve to shear or cut away from the mass of the bar a type-block or type-blank containing sufficient material to fill the die-space and to form a finished type; and that part of the edge of the typebar-blank which is operated upon, but is not compressed by the blade 5, and is not contained within the die-space, is compressed by the bottom wall 6 of the die and is rolled off sidewise of the typebar-blank when the die-carrier D is rolled back and forth transversely to the typebar-blank, but the material so rolled off is always confined endwise of the bar between the blade 5 and that portion of the stock contained in the typebar-blank immediately in advance of and below the inner forward wall 6‴ of the die. Hence none of this surplus material is operated on in such a manner as to force it into the field of an adjacent type or space, but instead all of the excess, whether it is forced out by the edge of the blade 5 or by the bottom wall 6 of the die, flows sidewise of the blank and may be severed from the bar to bring the sides of the latter into parallelism with each other. In practicing my present process each of these dies is so constructed as to form a type only, and it is not intended to form any portion of the space in advance of the type formed by such die. For this reason the extreme, outer, forward wall of the die, which wall is designated herein by 10, should be substantially coincident with the extreme forward portion of that part of the die-space which outlines the face of the type. The die shown in detail in Figs. 12 to 14, inclusive, is that for forming the letter "o", and as the extreme forward point in the face of this letter is the center of the forward side thereof it will be seen that it is only at this central point that the extreme, outer, forward wall of the die need be coincident with the outline of the type-face-forming portion of the die-space. Hence in this die the forward wall is cut away to form a substantially V-shaped portion 10′, the point of which is substantially in the plane of intersection of the type-face-forming wall of the die and the extreme forward edge 10″ of the inner, forward wall thereof. Hence when the die is operated in contact with the blank to form the appropriate type—in this case the letter "o"—every point in the outline of such face will stand out clearly in relief except the central point of the extreme forward outer edge of said type, which will be substantially in the horizontal plane of adjacent stock of the space-field, and this portion of the outline of the type may be defined by the space-forming tool when the latter is operated to form the space in a manner which will be hereinafter more particularly described.

Of course it should be understood that the details of the die construction for producing the result just described will vary somewhat with different dies, but in every case where the die is so constructed as to be suitable for carrying out the process of making a type without forming any portion of the space in advance thereof, said die should have the extreme, outer, forward wall thereof intersect the extreme, inner, forward wall of the die substantially in the plane of the type-face-forming wall of said die.

The manner in which and the extent to which the type-formative material confined between the blade 5 and the stock in advance of the forward wall 10 is operated upon are dependent upon the rolling movement of the die and also upon the feed movement of the blank. In this case the latter is fed step by step toward the die in a regular manner as the die travels back and forth across the edge of the blank, and hence during the rolling movement of the die the type-forming action will be carried down into the stock through successive and substantially equal distances, although, of course, it will be understood that the effect of the rolling action upon the blank will not be the same for each operation of the die.

The best results that I have been able to obtain in the manufacture of typebars from cold metal have been secured by subjecting wrought-metal blanks to such operations as will tend to preserve, instead of impair, the strength of the material. The operations by which this result is obtained are those by which wrought metal is usually formed or to which wrought metal is ordinarily subjected—that is, rolling, swaging, forging, &c.—and by means of these operations types are wrought into form on the edge of a typebar-blank according to my improved process.

While, in the preferred mode of practicing my invention, a single die may be employed for performing all of the operations to which the cold-metal blank is to be subjected, yet it should be understood that the several operations to which it is necessary to subject a solid blank in order to form a wrought-metal type may be carried out in any suitable manner so long as the desired result is obtained. Here, however, the swaging of the face of the type will be performed by the face or inner wall of the die; the rolling will be accomplished chiefly by the base or outer wall of the die and by the edge of the die-blade; and the forging of the type-body will be effected principally by means of the end walls of the die, which will usually be considerably inclined in order that the type may be shaped properly and sufficient room left between such walls and the corresponding sides of the type to assure the filling of the die-space during the final stages of the type-making operation.

The manner in which a type is shaped when the blank is subjected to the action of a rolling die during the feeding of the blank toward the die is somewhat complex but is clearly illustrated in Figs. 15, 16, 17, 18, 19, and 20, which illustrate the appearance of the forming type during certain stages of the operation. As the die is swung toward the right and toward the left alternately and the blank is fed toward the die either during or after the type-forming action, as may be desired, the stock at the base of the type-blank or type-block $t$ is forged first at the left-hand side and then at the right-hand side, as seen in Figs. 15, 16, &c., the forging action being, of course, the greatest near the base of the type-block and also being greater as the forging action is carried farther and farther down into the stock. This forging action, however, extends up the entire length of the side being operated upon and results in a thorough compacting or condensing of the particles of the blank. The forging action being greatest at the base of the type-blank the latter will be strengthened most in the region of its base, but the strengthened base will also be connected with the face of the type by a thick layer of condensed metal thoroughly compacted by the forging operation. At the same time that this metal is compressed by the forging action of the end walls 6' of the die-space the central upper portion of the type-blank is forced upward into the die owing to the resistance opposed to the forging action by the upper walls 8 and 8' of said die-space. At each movement of the die toward one of its extreme positions the metal so forced up tends to fill one side of the space 9, while the opposite side of said space forms an outlet through which the air confined between the type-blank and the die may escape. As the operation continues, and the die is rolled first to one side and then to the other, following the two branches 19 and 19' of the cycloid toward and from their cusp of intersection, the opposite ends of the type-block, especially near the base thereof, are more and more condensed by the forging operation and the upper portion or head of the type-block is forced up farther and farther until the metal completely fills the die-space. During these two movements—viz., the rolling of the die and the feeding of the blank toward the die—the cutting edges 6'' of the die shear farther and farther into the metal of the typebar-blank and gradually complete the cutting out of the type-block or type-blank from the mass of the metal. This type-blank, it will be seen, is not completely sheared from the typebar-blank until the actual completion of the making of the type. In other words, the shearing of the type-blank and the formation of a type from that type-blank are substantially co-incident in the present application as in my companion applications hereinbefore mentioned. Each time that a feed movement of the blank and a rolling movement of the die occur an additional portion of the surplus material confined between the die-blade 5 and the mass of metal in advance of the outer forward wall of the die is forced out sidewise of the blank principally by the bottom wall 6. After such portion of the surplus has been forced out sidewise in this manner the cutting edges 6″ at the next operation shear farther into the body of the blank and the metal at the point at which such cutting edge previously operated is forced farther out toward or beyond the side of the bar.

Figs. 15, 16, 17, 18, 19, and 20 illustrate, respectively, the first, four intermediate, and the final rolling operations, the positions of the die as it moves toward and away from the blank along the cyclodial curves 19 and 19′ being shown in each of these figures in dotted lines, and its central working position being shown in each case in full lines. Of course, when the die and the blank are separated they should withdraw from one another in such a manner as not to impair the finished type, and this result is preferably accomplished in the present case by simply dropping the blank $b$ and the blank-holder B′.

As before stated, the space in advance of each individual type which should separate it from the next succeeding type is intended to be performed in this particular process after the completion of the type immediately in its rear, and this method of forming a type and the next space in advance thereof is clearly illustrated in Figs. 4, 5, 10, and 11. By referring to the last two of these figures it will be seen that the stock contained in the space-field—this being the space occupied by the material upon which the space-forming tool operates—is not removed until the preceding type has been completely formed, and hence the support which is necessary at the forward side of and below the forming type for the purpose of preventing imperfect location of such type is not at all disturbed when the type is first completely shaped and the space afterward cut. In this case I have shown a space-forming tool in the form of a milling-cutter $c$, carried by a rotary shaft 20, which may be operated by any suitable means, (not shown,) said shaft being journaled in this case on a suitable cutter-carrier, such as a lever 21, pivoted at 22. This milling-cutter $c$ preferably has cutting faces both on the periphery and on the forward side thereof, the peripheral cutting teeth being designated herein by $c'$ and the side cutting teeth by $c''$. These side cutting teeth are oblique or beveled cutting edges, in order that the milling-cutter may cut not only the bottom of the space but may also form a forward wall which will be inclined forward toward the upper edge of the blank, as shown at $s'$. The rear side of the milling-cutter $c$ is preferably a plane surface and is intended to work in the plane of the extreme, outer, forward wall of the die $d$; that is to say, the extreme rear end of each cutting face $c'$ will operate in a plane passing through the central point of the extreme, forward edge of the face of a previously-formed type. As the cutter $c$ is rotated the handle of the lever 21 may be gradually pressed downward from its extreme, upper position, indicated by the line 21′, to the extreme lower position, indicated by the line 21″, it being understood that during the space-forming operation the blank $b$ will preferably be in its lowermost position, to which it will ordinarily be dropped after the completion of each type-making operation. By gradually lowering said lever while the cutter is rotating the space $s$ will be formed gradually with an upwardly and forwardly inclined wall $s'$. This operation may be carried down substantially to the level indicated by the line $s''$. Whether the space-formative material be removed while the die is maintained in the position shown in Fig. 10, or whether it be formed after the die and the blank have been separated, is of but slight importance, owing to the fact that the milling-cutter merely removes the metal and does not force any portion of the metal in the space-field into an adjacent-type field, the operation shown, however, being that in which the blank and the die are separated before the milling-cutter begins to operate upon the stock.

It will be noticed that the space formed by the cutter $c$ is considerably wider than the space which finally separates two adjacent completed types. The reason for this is that during the formation of the next succeeding type after the completion of a space in the rear thereof the stock which forms such type is not only forced downward but is also forced backward, is tipped over or flows on to the bottom wall $s''$ of the space formed by the cutter, partially fills up such space, and also carries down the line $s''$ to substantially the position indicated by the broken lines $s'''$, the result being that the types and spaces overlap upon the edge of the finished type-bar, all of which is more particularly set forth in my companion application Serial No. 38,614, filed December 4, 1900.

After one type has been formed on the typebar-blank another may be shaped in substantially the same way, but in every case the blade 5 should be so located as to lie close to the side of the preceding, finished type, in order that the types when finished may be sufficiently close to one another.

The fins $f$ and $f'$, which are rolled off from the sides of the bar by the conjoint action of the bottom wall of the die and, the edge of the blade 5, may be removed at any proper time and in any suitable manner, a pair of cutting tools, such as C, being shown herein for this purpose, these preferably operating after a series of types has been formed.

Figure 1:
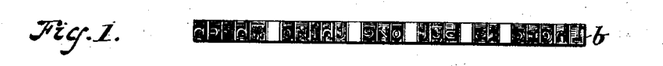
Figures 1 and 2 are, respectively, a plan and a side elevation of a typebar made by my improved process and enlarged about two-thirds.
Figure 2:
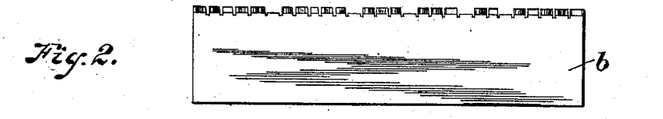
Figure 3:
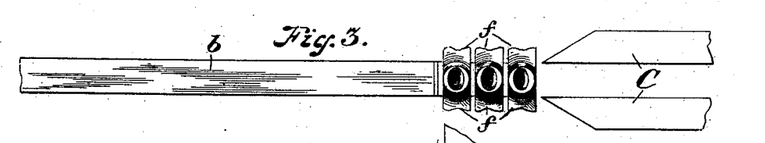
Fig. 3 is a plan of a portion of the partially-finished bar enlarged to about five times the natural size, and illustrates the appearance of the finished and partially-finished types and spaces on the edge of a typebar-blank.
Figure 4:
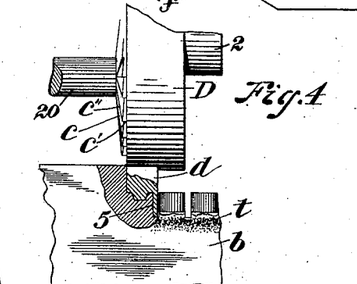
Fig. 4 is a side elevation of the same, illustrating in section the operation of a die for forming a type without previously removing stock in advance thereof.
Figure 5:
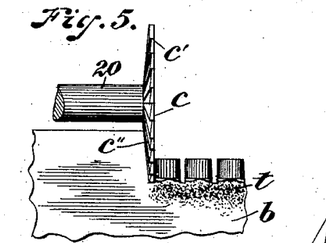
Fig. 5 is a side elevation of the same, illustrating the operation of a space-forming tool or milling-cutter for forming a space in advance of a type after the completion of the latter.
Figure 6:
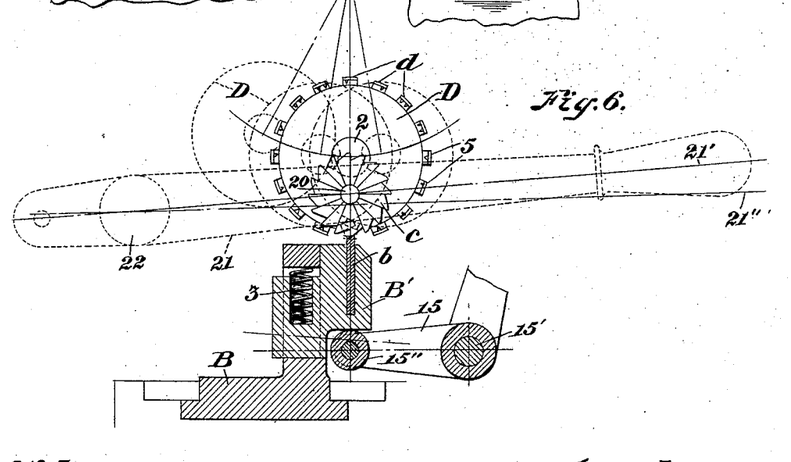
Fig. 6 is a sectional elevation illustrating a die-wheel, a space-forming milling-cutter, and blank-feeding means coöperating with a typebar-blank, the parts being shown on the same scale as in Figs. 1 and 2.
Figure 7:
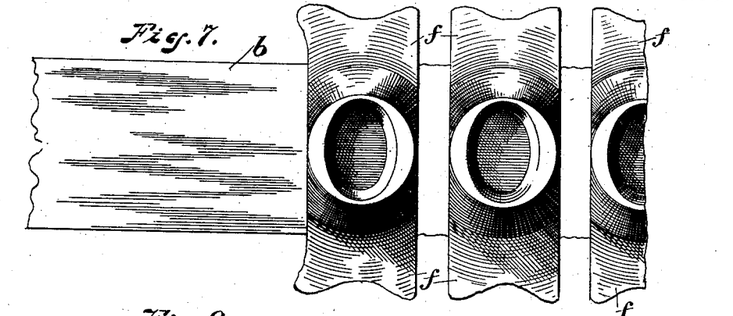
Figs. 7, 8, and 9 are, respectively, a plan, a side elevation, and a central longitudinal section of a portion of a partially-finished bar enlarged to about twenty times the natural size, and illustrate in detail the manner in which the respective types and spaces are formed and the effects produced by the compression and dislodgment of material in forming the types.
Figure 8:
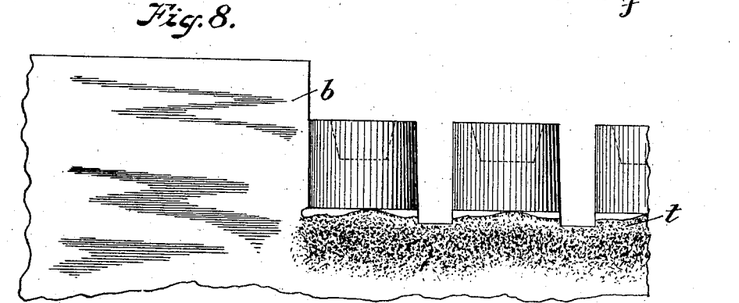
Figure 9:
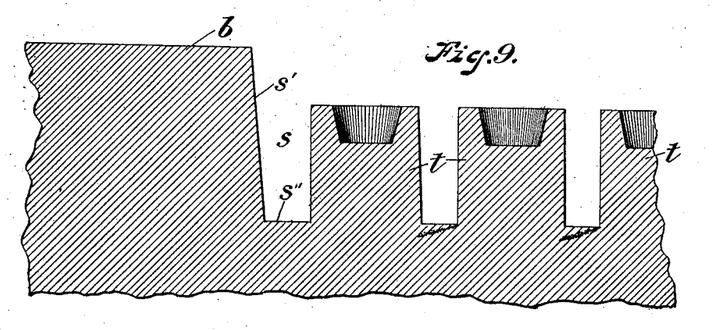
Figure 10:
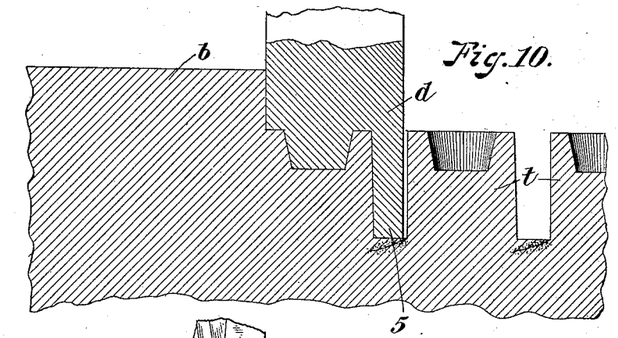
Figs. 10 and 11 are central longitudinal sections similar to Fig. 9, and illustrate, respectively, how the separate type-forming and space-forming operations are performed.
Figure 11:
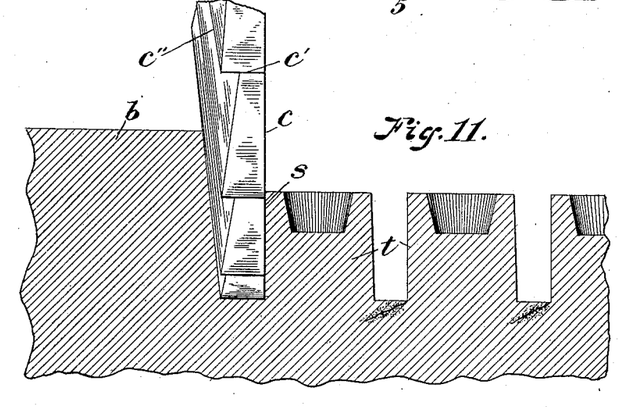

The spaces between groups of letters or words may be formed in any suitable way, but preferably by means of blank dies which will roll the metal off in substantially the manner just described and as shown in Figs. 1 and 2. These blank spaces may be of any suitable widths, and, of course, the letters themselves will be of varying widths, but in all cases it is desirable to form between the words spaces of such widths as to make typebars of uniform lengths, whether the blank spaces be of the same width or of varying widths, thus assuring the formation of typebars having the types thereon properly spaced.

Having thus described my invention, I claim—

1. That improvement in the art of making a typebar, which consists in subjecting a portion of the edge of a typebar blank to the repeated treatment of a type die, thereby forming a type, and in making a space adjoining said type and in advance thereof after the completion of the type.

2. That improvement in the art of making a typebar, which consists in imparting to a typebar blank and a type die a curvilinear movement with respect to each other, thereby forming a type, and in making a space adjoining said type and in advance thereof after the completion of the type.

3. That improvement in the art of making a typebar, which consists in rolling a portion of the edge of a typebar-blank while in contact with a type-die and thereby forming a type, and forming a space adjoining said type and in advance thereof after the completion of said type.

4. That improvement in the art of making a typebar, which consists in rolling a portion of the edge of a typebar-blank in opposite directions alternately while in contact with a type-die and thereby forming a type, and forming a space adjoining said type and in advance thereof after the completion of said type.

5. That improvement in the art of making a typebar, which consists in successively compressing in contact with a type-die a portion of the edge of a typebar-blank and thereby forming a type; successively forming a space adjoining said type and in advance thereof after the completion of said type; and feeding one of the said two coöperative members toward the other during the type formation.

6. That improvement in the art of making a typebar, which consists in compressing in contact with a type-die a portion of the edge of a type bar-blank and forcing surplus material beyond the sides of the blank and thereby forming a type; forming a space adjoining said type and in advance thereof after the completion of said type; and separating the aforesaid surplus material from the blank.

7. That improvement in the art of making a typebar, which consists in reciprocating a type-die in a curvilinear path while in contact with a typebar-blank, and forming a space adjoining said type and in advance thereof after the completion of said type.

8. That improvement in the art of making a typebar, which consists in compressing in contact with a type-die a portion of the edge of a typebar-blank and thereby forming a type; separating the blank and the die after the completion of said type; and forming a space adjoining said type and in advance thereof after the separation of said blank and die before the making of the next type is begun.

9. That improvement in the art of making a typebar, which consists in compressing in contact with a type-die a portion of the edge of a typebar-blank and thereby forming a type, and forming in advance of said type after the completion of the latter before the making of the next type is begun a space having its rear wall substantially in the plane of the extreme outer forward wall of said type.

10. That improvement in the art of making a typebar, which consists in compressing in contact with a type-die a portion of the edge of a typebar-blank and forcing surplus material beyond the sides of the blank and thereby forming a type; forming a space adjoining said type and in advance thereof after the completion of said type and before the making of the next type is begun; and separating the aforesaid surplus material from the blank after the completion of said space.

11. That improvement in the art of making a line of type which consists in subjecting a blank to a series of successive reductions to form types and subsequent to the making of each type an independent reduction to form spaces between such types.

12. That improvement in the art of making a type which consists in reciprocating a die across the edge of a blank, the one relatively to the other, and in independently making a space at the side of the type subsequently to the completion thereof.

13. That improvement in the art of making a type which consists in reciprocating a die across the edge of a blank, the one relatively to the other, in independently making a space at the side of the type subsequently to the completion thereof, and in feeding the die and the blank and the space-forming means and the blank, the one relatively to the other, during the making of the type and the space respectively.

14. That improvement in the art of making a typebar which consists in reciprocating the typebar blank and selectively located type dies, the one relatively to the other, during the making of each type, and in making a space at the side of each type subsequently to the completion thereof.

15. That improvement in the art of making a line of type which consists in subjecting a blank to a gradual reduction to form types and subsequent to the making of each type to an independent gradual reduction to form spaces between such types.

16. That improvement in the art of making a line of type which consists in subjecting a blank to a succession of gradual reductions to form a succession of types and subsequent to the making of each type to a succession of independent gradual reductions to form spaces between such types.

17. That improvement in the art of making a line of type which consists in subjecting a blank to a succession of individual gradual reductions to form a succession of types and to a succession of independent gradual reductions to form, subsequently to the making of each type, a space at the side thereof.

18. That improvement in the art of making a line of type which consists in subjecting a blank to a rolling treatment to form types and subsequent to the making of each type to an independent rolling treatment to form spaces between such types.

19. That improvement in the art of making a line of type which consists in subjecting a blank to a gradual rolling treatment to form types and subsequent to the making of each type to an independent gradual rolling treatment to form spaces between such types.

20. That improvement in the art of making a line of type which consists in successively impressing a blank to make a succession of individual types and making indentation in the blank at the side of the type last made prior to the inauguration of the successive type making operations.

21. That improvement in the art of making a line of type which consists in impressing a blank to make a succession of types and in operating on the blank at the side of each type with a tool independent of the type-making instrumentality and subsequently to the forming of the type to make at the side of the type a space.

22. That improvement in the art of making a line of type which consists in subjecting a blank to a succession of gradual individual reductions to form a succession of individual types and to a succession of independent gradual individual reductions to form previously to the making of a type and subsequently to the making of the immediately preceding type, a space between such preceding type and the impression receiving edge of the blank.

23. That improvement in the art of making a line of type upon a blank which consists in subjecting the blank at each of a number of portions successively to a series of reductions for forming, at each portion a type, and alternately with the type-making subjecting the blank adjacent to each formed type to a series of reductions for forming a space.

FRANCIS H. RICHARDS.

Witnesses:
 FRED. J. DOLE,
 C. E. VOSS.